UNITED STATES PATENT OFFICE.

LEWIS E. SAUNDERS AND RAY HILL WHITE, OF NIAGARA FALLS, NEW YORK, ASSIGNORS TO NORTON COMPANY, OF WORCESTER, MASSACHUSETTS, A CORPORATION OF MASSACHUSETTS.

COMPOSITION CONTAINING ALUMINA AND ZIRCONIA.

1,240,490.     Specification of Letters Patent.     Patented Sept. 18, 1917.

No Drawing.     Application filed February 12, 1917. Serial No. 148,265.

*To all whom it may concern:*

Be it known that we, LEWIS E. SAUNDERS and RAY HILL WHITE, citizens of the United States, residing at Niagara Falls, in the county of Niagara and State of New York, have invented certain new and useful Improvements in Compositions Containing Alumina and Zirconia, of which the following is a specification.

This invention relates to an aluminous composition or product containing substantial proportions of zirconia.

It is known that an abrasive material consisting of crystalline alumina substantially free from fluxing oxids, as disclosed for example in U. S. Patent No. 954,808, patented April 12, 1910, to Jeppson and Saunders, is characterized by a relatively hard grain, which is however comparatively weak in structure, breaking down readily under compression or impact, and under the conditions of use in grinding. The possession of these qualities adapts the material in the highest degree for certain special uses, including the precision grinding of steel. The presence of certain oxids in the charge to be fused in the electric furnace profoundly modifies these characteristics, and yields an abrasive grain which finds its special applications along quite other lines. For example, silica and titanium oxid, singly or together, in limited proportions yield a much stronger grain. Ferric oxid on the other hand is substantially neutral in so far as the strength of the grain is concerned, so that electric-furnace products consisting essentially of alumina crystals associated with limited proportions of ferric oxid exhibit the essential abrasive qualities of the substantially pure alumina itself, as more fully explained in our copending application Serial No. 148,264, filed herewith.

The present invention relates broadly to products containing as essential components the oxids of aluminum and zirconium, irrespective of the presence therein of oxids other than those of aluminum and zirconium. Such products are best prepared by the electric furnace fusion of the appropriate charges, consisting of the oxids of aluminum and zirconium, with or without other oxids, such as those of silicon, titanium and iron.

More specifically, the invention relates to products consisting essentially of alumina and zirconia, other oxids being either absent, or present in such relatively small proportions as to be without material effect upon the character of the product, whether applied to abrasive or other purposes. An illustrative product of the last-mentioned type which has been found well adapted for use as an abrasive, contained in addition to approximately 95 per cent. of alumina,—

$SiO_2$ ---------------------- 0.30%
$Fe_2O_3$ ---------------------- 0.16%
$ZrO_2$ ---------------------- 4.10%

The zirconia content may be widely varied, according to the special purpose in view or the special properties sought. The above product for example is a dense, fine-grained mass, in which the individual grains show a marked tendency to crystal development. These individual grains are for the most part comprised within the diameters of one-sixteenth to one sixty-fourth inch. They possess a weak structure of such character that the particle or grain breaks rather readily under compression or impact into a large number of much smaller particles of approximately uniform size. In other words, the grain shows a tendency to powder instead of cracking or splintering. This peculiar property adapts the product especially for use in certain grinding and polishing operations, particularly the grinding and polishing of glass, or when bonded into wheels, for glass-cutting.

Our composition is also useful as a refractory, and for this purpose has been prepared with proportions of zirconia up to the equimolecular proportion with the alumina.

As compared with pure alumina, the furnace charges containing even the lower percentages of zirconia, say below ten per cent., are characterized by a high degree of fluidity, which is a material advantage in the electric furnace operation, including pouring or tapping if desired. Furthermore, when the grains are bonded into wheels, using the ordinary ceramic bonds, it is found that a harder grade of wheel is obtained with a like proportion of bond. By harder grade is meant that the wheel is one from which the grains are less readily dislodged.

The properties of the products consisting essentially of alumina and zirconia are quite distinct from those of products prepared, for example, by adding zirconia to bauxite or other impure aluminous material, and subjecting the mixture to electric furnace fusion. Products of this latter type are described and specifically claimed in our co-pending application Serial No. 148,266, filed herewith. They are characterized by great strength of grain, and also possess to a high degree the excellent bonding qualities which result in a hard grade of grinding-wheel.

We claim:—

1. A crystalline aluminous product containing zirconia.

2. An electric furnace product, comprising a finely crystalline mass consisting essentially of alumina and zirconia.

3. An electric furnace abrasive, comprising a finely crystalline mass consisting essentially of alumina and zirconia, the alumina in preponderant proportions.

4. An abrasive implement comprising grains of an aluminous abrasive containing zirconia, and a ceramic bond for said grains.

5. An abrasive implement comprising grains consisting essentially of alumina and zirconia, and a ceramic bond for said grains.

In testimony whereof, we affix our signatures.

LEWIS E. SAUNDERS.
RAY HILL WHITE.